(12) United States Patent
Ishida et al.

(10) Patent No.: US 8,040,121 B2
(45) Date of Patent: Oct. 18, 2011

(54) SWITCHING REGULATOR

(75) Inventors: Makoto Ishida, Osaka (JP); Takashi Ryu, Kyoto (JP); Takuya Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/974,624

(22) Filed: Dec. 21, 2010

(65) Prior Publication Data

US 2011/0089925 A1   Apr. 21, 2011

Related U.S. Application Data

(63) Continuation of application No. PCT/JP2010/003225, filed on May 12, 2010.

(30) Foreign Application Priority Data

Oct. 9, 2009  (JP) ................................. 2009-235286

(51) Int. Cl.
*G05F 1/575*  (2006.01)
*G05F 1/618*  (2006.01)

(52) U.S. Cl. ...................................................... 323/285

(58) Field of Classification Search .................. 323/282, 323/283, 284, 285, 351

See application file for complete search history.

(56) References Cited

U.S. PATENT DOCUMENTS

| | | | |
|---|---|---|---|
| 6,300,810 B1 | 10/2001 | Hardee | |
| 6,369,555 B2 | 4/2002 | Rincon-Mora | |
| 7,202,642 B1 | 4/2007 | Chen et al. | |
| 7,482,793 B2* | 1/2009 | Stoichita | 323/282 |
| 7,764,057 B2* | 7/2010 | Groom | 323/283 |
| 2009/0160414 A1 | 6/2009 | Hachiya et al. | |

FOREIGN PATENT DOCUMENTS

| | | |
|---|---|---|
| JP | 2003-111400 | 4/2003 |
| JP | 2008-92740 | 4/2008 |

* cited by examiner

*Primary Examiner* — Gary L Laxton
(74) *Attorney, Agent, or Firm* — McDermott Will & Emery LLP (57) ABSTRACT

A switching regulator is configured to generate an output voltage by stepping down an input voltage by switching control of a switching element. The switching regulator includes a first comparator configured to compare a feedback voltage of the output voltage and a target voltage; a second comparator configured to compare magnitude of a current flowing through the switching element and a predetermined value; an on-time timer configured to measure fixed on-time for on-control of the switching element; an off-time timer configured to measure fixed off-time for off-control of the switching element; and a control circuit configured to perform the on-control of the switching element with the fixed on-time in accordance with an output of the first comparator, and the off-control of the switching element with the fixed off-time in accordance with an output of the second comparator.

12 Claims, 4 Drawing Sheets

SWITCHING REGULATOR

CROSS-REFERENCE TO RELATED APPLICATION

This is a continuation of PCT International Application PCT/JP2010/003225 filed on May 12, 2010, which claims priority to Japanese Patent Application No. 2009-235286 filed on Oct. 9, 2009. The disclosures of these applications including the specifications, the drawings, and the claims are hereby incorporated by reference in their entirety.

BACKGROUND

The present disclosure relates to switching regulators, and more particularly to overcurrent protection of switching regulators in a hysteretic control mode.

In general, switching regulators can efficiently convert electrical power, and thus are used as power supply circuits of various electronic devices. In particular, in mobile devices using a battery as an input voltage source, control is performed, such as appropriately changing electrical power supplied to an electronic circuit in accordance with the use condition so as to enable long-term use. Therefore, switching regulators responding to a change in the use condition at high speed are required.

Some of these switching regulators do not perform feedback control using error amplifiers but hysteretic control for controlling a switching element using a comparator so that an output voltage falls within a predetermined range. The hysteretic control does not require operation time determined by a slew rate of an error amplifier, and thus, enables high-speed responses.

Although output ripple amplitude needs to be large to perform stable hysteretic control, a proper output voltage cannot be obtained when the amplitude is too large. Thus, a virtual ripple voltage, which is obtained by superimposing a voltage having a reversed waveform to an output ripple on a reference voltage, is used to control a switching element to be on for a predetermined time period, when an output voltage is lower than the virtual ripple voltage.

SUMMARY

In some switching regulators, overcurrent protection is performed to limit a peak current flowing to a switching element. When the overcurrent protection functions, the switching element is forcibly controlled to be off. Thus, in a conventional switching regulator in a hysteretic control mode, overcurrent protection renders on-time of the switching element shorter than a predetermined time period (fixed on-time) to lower an output voltage. This also reduces the period from when the switching element is turned off until when the output voltage becomes lower than the virtual ripple voltage, i.e., off-time of the switching element. As a result, a switching frequency rises so that the overcurrent protection may not function sufficiently. Moreover, if the output voltage is constantly lower than a target voltage due to the overcurrent protection, a signal for controlling the switching element to be on for a predetermined time period is not output, and then, the switching element may not be back to the hysteretic control.

A switching regulator in a hysteretic control mode according to the present disclosure achieves excellent overcurrent protection. As an example, a switching regulator is configured to generate an output voltage by stepping down an input voltage by switching control of a switching element. The switching regulator includes a first comparator configured to compare a feedback voltage of the output voltage and a target voltage; a second comparator configured to compare magnitude of a current flowing through the switching element and a predetermined value; an on-time timer configured to measure fixed on-time for on-control of the switching element; an off-time timer configured to measure fixed off-time for off-control of the switching element; and a control circuit configured to perform the on-control of the switching element with the fixed on-time in accordance with an output of the first comparator, and the off-control of the switching element with the fixed off-time in accordance with an output of the second comparator. This configuration enables in normal operation, hysteretic control in which the on-timed is fixed and the off-time is controlled, and enables in overcurrent protection, peak current control in which the off-time is fixed and the on-time is controlled.

DETAILED DESCRIPTION

First Embodiment

Figure 1:
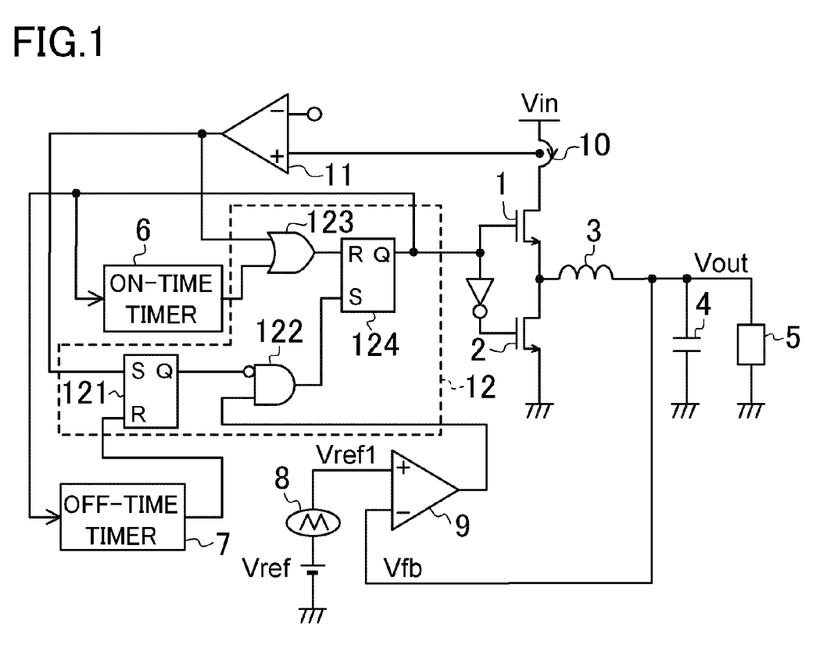
FIG. 1 is a configuration diagram of a switching regulator according to a first embodiment.

FIG. 1 illustrates a configuration of a switching regulator according to a first embodiment. The switching regulator according to this embodiment alternately turns on/off switching elements 1 and 2 connected to an inductor 3, thereby stepping down an input voltage Vin from e.g., a battery etc., to supply an output voltage Vout smoothed by a capacitor 4 to an output load 5.

An on-time timer 6 measures fixed on-time for on-control of the switching element 1. Specifically, the on-time timer 6 outputs a pulse after the fixed on-time has passed, using a rising edge of a control signal of the switching element 1 as a trigger. An off-time timer 7 measures fixed off-time for off-control of the switching element 1. Specifically, the off-time timer 7 outputs a pulse after the fixed off-time has passed, using a falling edge of a control signal of the switching element 1 as a trigger.

A virtual ripple generator 8 outputs a target voltage Vref1 which gradually rises from a reference voltage Vref every time the switching element 1 is turned off, and gradually falls to the reference voltage Vref when the switching element 1 is on. A comparator 9 compares the target voltage Vref1 and a voltage Vfb which is a feedback voltage of the output voltage Vout, and sets an output to an H level when the voltage Vfb is lower than the target voltage Vref1. The current detector 10 detects a current flowing through the switching element 1. A comparator 11 compares an output of the current detector 10 and a predetermined value. The predetermined value corresponds to a maximum value of the current flowing through the switching element 1.

A control circuit 12 performs the on-control of the switching element 1 with the fixed on-time in accordance with an output of the comparator 9, and the off-control of the switching element 1 with the fixed off-time in accordance with an output of the comparator 11. Specifically, in the control circuit 12, a latch circuit 121 is set by the output of the comparator 11, and reset by an output of the off-time timer 7. A logic circuit 122 performs AND operation on the output of the comparator 9 and an inverted output of the latch circuit 121. A logic circuit 123 performs OR operation on the output of the comparator 11 and an output of the on-time timer 6. A latch circuit 124 is set by an output of the logic circuit 122, and reset by an output of the logic circuit 123. An output of the latch circuit 124 and the inverted output are the control signals of the switching elements 1 and 2, respectively.

Operation of the switching regulator according to this embodiment will be described below.

Normal Operation

In normal operation, an overcurrent does not flow through the switching element 1, and the output of the comparator 11 is at an L level. Thus, the output of the logic circuit 123 is equal to the output of the on-time timer 6. The latch circuit 121 is a reset state, and the output is at an L level. Thus, the output of the logic circuit 122 is equal to the output of the comparator 9. When the voltage Vfb is lower than the target voltage Vref1, the output of the comparator 9 goes to an H level, and the latch circuit 124 is set. As a result, the switching element 1 is controlled to be on. Then, after the fixed on-time has passed from the start of the on-control of the switching element 1, a pulse is output from the on-time timer 6, and the latch circuit 124 is reset. As a result, the switching element 1 is controlled to be off. In the normal operation, the above operation is repeated, thereby stably supplying the output voltage Vout with reduced ripple.

Overcurrent Protection

When the current flowing through the switching element 1 is larger than an upper limit due to overload etc., the output of the comparator 11 is set to an H level. Then, the output of the logic circuit 123 is set to an H level, the latch circuit 124 is reset, and the switching element 1 is controlled to be off. That is, when an overcurrent is detected, the switching element 1 is forcibly controlled to be turned off even when it is in the on-control. By turning off the switching element 1, electrical power supplied from an input voltage source is limited to lead to overcurrent drop, such as lowering of the output voltage Vout. As a result, the output of the comparator 9 goes to the H level. However, since the latch circuit 121 is set when the output of the comparator 11 is at the H level, the output of the comparator 9 is masked by the logic circuit 122. Thus, even when the output of the comparator 9 is at the H level, the latch circuit 124 is not set immediately. When the fixed off-time has passed from the start of the off-control of the switching element 1, a pulse is output from the off-time timer 7, and the output of the logic circuit 122 goes to an H level. This sets the latch circuit 124 to restart the on-control of the switching element 1.

As described above, according to this embodiment, hysteretic control, in which on-time is fixed, is performed in the normal operation. The control is switched in overcurrent protection, to peak current control in which the off-time is fixed. This feature reduces a rise in a switching frequency in the overcurrent protection and provides sufficient dropping characteristics. Moreover, the switch from the peak current control to the hysteretic control can be reliably performed.

Note that an inverted output of the comparator 11 and the inverted output of the latch circuit 121 may be used as the trigger of the off-time timer 7. In place of the output of the comparator 11, the output of the latch circuit 121 may be input to the logic circuit 123. The virtual ripple generator 8 may be omitted.

The voltage Vfb is not necessarily the output voltage Vout itself but may be proportional to the output voltage Vout. For example, a divided voltage of the output voltage Vout with a plurality of resistors may be used as the voltage Vfb. The switching element 2 may be replaced by a diode.

Second Embodiment

Figure 2:
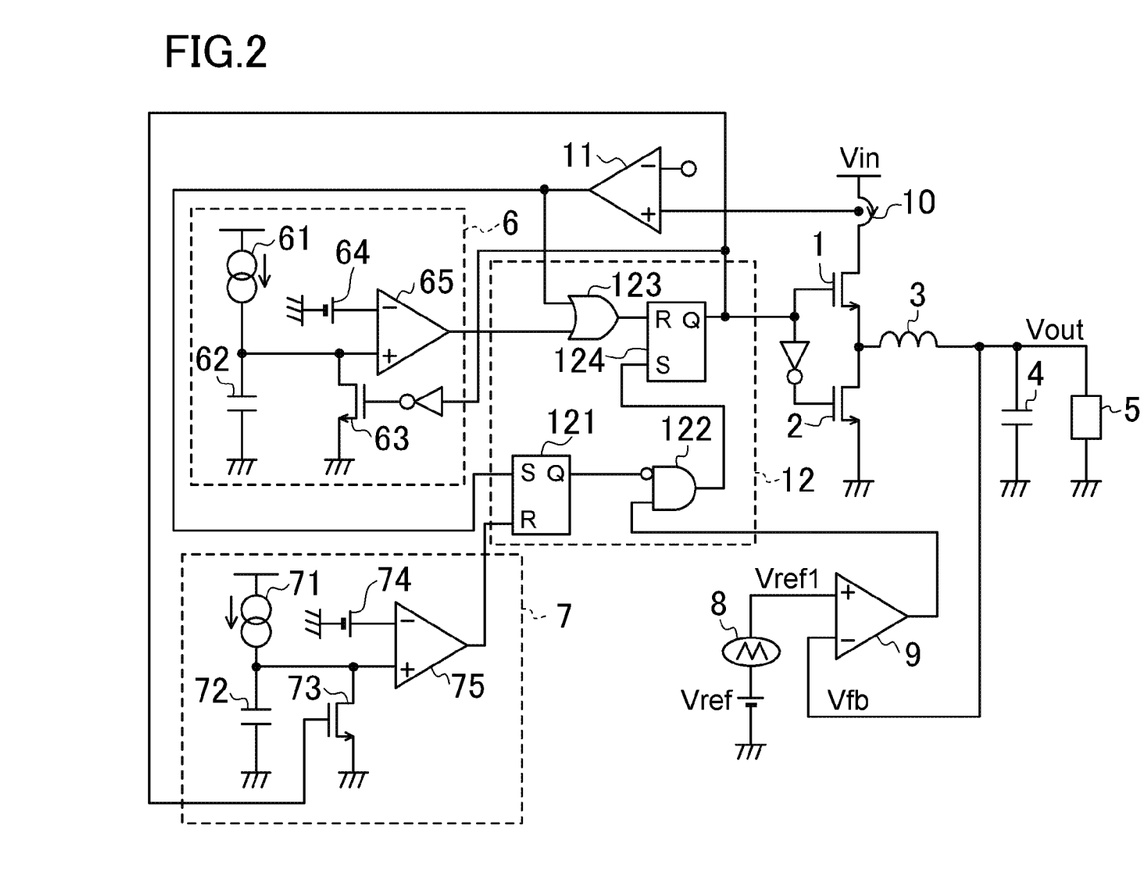
FIG. 2 is a configuration diagram of a switching regulator according to a second embodiment.

FIG. 2 illustrates a configuration of a switching regulator according to a second embodiment. The switching regulator according to this embodiment has a similar schematic configuration to that in the first embodiment. Example configurations of the on-time timer 6 and the off-time timer 7 will be described below.

In the on-time timer 6, a current source 61 outputs a current Vin/Ron where Ron is a virtual resistance value. A capacitive element 62 is connected to the current source 61, and a switching element 63 is connected in parallel to the capacitive element 62. The switching element 63 is controlled by, e.g., the inverted output of the latch circuit 124. A voltage source 64 outputs a voltage KVout where K is a constant. A voltage comparator 65 compares an output of the voltage source 64 and a charging voltage of the capacitive element 62.

In the off-time timer 7, a current source 71 outputs a current Vin/Roff where Roff is a virtual resistance value. A capacitive element 72 is connected to the current source 71, and a switching element 73 is connected in parallel to the capacitive element 72. The switching element 73 is controlled by, e.g., the output of the latch circuit 124. A voltage source 74 outputs a voltage K (Vin−Vout). A voltage comparator 75 compares an output of the voltage source 74 and a charging voltage of the capacitive element 72.

Operation of the on-time timer 6 and the off-time timer 7 will be described below.

Operation of On-Time Timer

The on-time timer 6 mainly operates during normal operation of the switching regulator. When the output of the latch circuit 124 is at an H level, the on-control of the switching element 1 starts and the switching element 63 becomes nonconductive. This starts charge of the capacitive element 62 which had been discharged until then. When the charging voltage of the capacitive element 62 reaches the voltage KVout, an output of the voltage comparator 65 goes to an H level and the latch circuit 124 is reset. That is, the time period from when the charge of the capacitive element 62 starts until when the charging voltage reaches the voltage KVout corresponds to the fixed on-time, which is proportional to Vout/Vin.

Where capacitance of the capacitive element 62 is Con, on-time Ton of the switching element 1 is represented by $$Ton = ConRon \times KVout/Vin$$
$$= Vout/Vin \times T1.$$

Note that a constant T1=KConRon.

On the other hand, where a switching frequency of a step-down switching regulator is Ts, the following equation can be obtained.

$$Vout = Ton/Ts \times Vin$$

When the two equations are combined, Ts=T1 can be obtained. That is, regardless of fluctuations in the input voltage Vin and the output voltage Vout, the switching frequency can be held constant.

Operation of Off-Time Timer

The off-time timer 7 mainly operates during the overcurrent protection of the switching regulator. When an overcurrent is detected to set the output of the comparator 11 to an H level and set the output of the latch circuit 124 to an L level, forcible off-control of the switching element 1 starts and the switching element 73 becomes non-conductive. This starts charge of the capacitive element 72 which had been discharged until then. When the charging voltage of the capacitive element 72 reaches the voltage K (Vin−Vout), an output of the voltage comparator 75 goes to an H level, the latch circuit 121 is reset, and the latch circuit 124 is set. That is, the period from when the charge of the capacitive element 72 starts until when the charging voltage reaches the voltage K (Vin−Vout) corresponds to the fixed off-time, which is proportional to (Vin−Vout)/Vin.

Where capacitance of the capacitive element 72 is Coff, off-time Toff of the switching element 1 is represented by $$Toff = CoffRoff \times K(Vin - Vout)/Vin$$
$$= (Vin - Vout)/Vin \times T2.$$

Note that a constant T2=KCoffRoff.

On the other hand, where a switching frequency of a step-down switching regulator is Ts, the following equation can be obtained.

$$Vout = Ton/Ts \times Vin$$
$$= (Ts - Toff)/Ts \times Vin$$

When the two equations are combined, Ts=T2 can be obtained. That is, regardless of fluctuations in the input voltage Vin and the output voltage Vout, the switching frequency can be held constant.

As described above, this embodiment enables more stable switching control not influenced by the fluctuations in the input voltage Vin and the output voltage Vout. Moreover, since the fixed off-time increases with a decrease in the output voltage, higher-speed overcurrent drop characteristics can be obtained.

Note that, by setting the values of the elements to satisfy the equation T1=T2, the switching frequencies and the duty ratios in the normal operation and in the overcurrent protection are equal. This eliminates disorder of the switching control at the transition of the control modes, thereby enabling smooth transition of the control modes.

Third Embodiment

Figure 3:
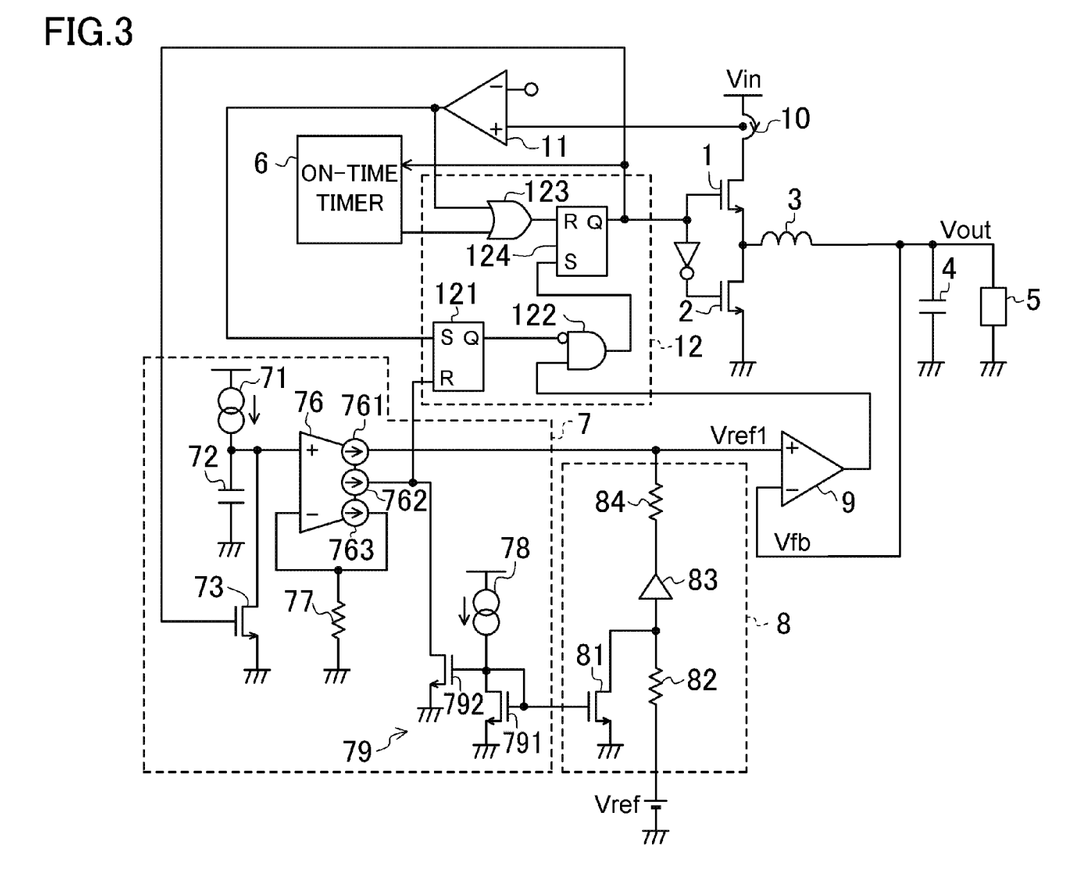
FIG. 3 is a configuration diagram of a switching regulator according to a third embodiment.

FIG. 3 illustrates a configuration of a switching regulator according to a third embodiment. The switching regulator according to this embodiment has a similar schematic configuration to that in the first embodiment. The on-time timer 6 is similar to that in the second embodiment. Example configurations of the off-time timer 7 and the virtual ripple generator 8 will be described below.

In the off-time timer 7, the current source 71 outputs a current Vout/Roff where Roff is a virtual resistance value. The capacitive element 72 is connected to the current source 71, and the switching element 73 is connected in parallel to the capacitive element 72. The switching element 73 is controlled by, e.g., the output of the latch circuit 124. The charging voltage of the capacitive element 72 is input to a positive input terminal of a gm amplifier 76. The gm amplifier 76 includes three current sources 761, 762, and 763 as three current outputs. A resistive element 77 is connected between the current source 763 and ground. A voltage of the resistive element 77 is input to a negative input terminal of the gm amplifier 76. A current source 78 outputs a current Vout (Vin−Vout)/Vin/Rx where Rx is a virtual resistance value. A current comparator 79 compares an output of the current source 78 and an output of the current source 762. Specifically, the current comparator 79 can be a current mirror circuit including transistors 791 and 792 provided at an input side and an output side, respectively.

In the virtual ripple generator 8, a transistor 81 forms a current mirror circuit together with the transistor 791, and functions as a current source outputting a mirror current of the output of the current source 78. A resistive element 82 is connected between a drain of the transistor 81 and the reference voltage Vref. A voltage of the resistive element 82 is input to the voltage buffer 83. A resistive element 84 is connected between the current source 761 and an output terminal of the voltage buffer 83. A voltage of the resistive element 84 is the target voltage Vref1.

Operation of the virtual ripple generator 8 and the off-time timer 7 will be described below.

In On-Control

In the on-control of the switching element 1, the output of the latch circuit 124 is at an H level, and the switching element 73 is conductive. Thus, ground potential is input to a positive input terminal of the gm amplifier 76, and the outputs of the current sources 761, 762, and 763 are zero. Therefore, an output of the current comparator 79 remains at an L level, and the off-time timer 7 is a non-operation state.

On the other hand, an output current of the current source 761 is also zero, and thus, no current flows through the resistive element 84 so that an output of the virtual ripple generator 8 is equal to an output voltage Vref' of a voltage buffer 83. Since an output current of the transistor 81 is Vout (Vin−Vout)/Vin/Rx, where a resistance value of the resistive element 82 is R1, the target voltage Vref1 is represented by $$Vref1 = Vref'$$
$$= Vref - Vout(Vin - Vout)/Vin \times R1/Rx.$$

That is, the target voltage Vref1 output from the virtual ripple generator 8 in the on-control of the switching element 1 is constant, and the value is adaptively controlled in accordance with the input voltage Vin and the output voltage Vout.

In Off-Control

When an overcurrent is detected to set the output of the comparator 11 to an H level, or a pulse is output from the on-time timer 6, the output of the latch circuit 124 goes to an L level so that the off-control of the switching element 1 starts and the switching element 73 becomes non-conductive. This starts charge of the capacitive element 72 which had been discharged until then, and currents, of which magnitude are proportional to the charging voltage, are output from the current sources 761, 762, and 763. Where capacitance of the capacitive element 72 is Coff, a charging voltage Vc is represented by $$Vc = Vout/Coff/Roff \times t.$$

Where transfer admittance of the current source 763 is gm3, and a voltage of the negative input terminal of the gm amplifier 76 is V3, an output current I3 of the current source 763 is represented by $$I3 = gm3 \times (Vout/Coff/Roff \times t - V3).$$

Where a resistance value of the resistive element 77 is R3, the voltage V3 is represented by $$V3 = I3 \times R3.$$

When the two equations are combined, the following equation can be obtained.

$$I3 = gm3 \times Vout/Coff/Roff \times t/(1+gm3 \times R3)$$

Where transfer admittance of the current source 761 is gm1, an output current I1 of the current source 761 is represented by $$I1 = gm1 \times Vout/Coff/Roff \times t/(1+gm3 \times R3).$$

Where a resistance value of the resistive element 84 is R2, the target voltage Vref1 is represented by $$\begin{aligned} Vref1 &= Vref' + R2 \times I1 \\ &= Vref' + R2 \times gm1 \times Vout/Coff/Roff \times t/(1+gm3 \times R3) \\ &= Vref' + Vout \times t/T3. \end{aligned}$$

Note that a constant T3=R2×gm1/Coff/Roff×t/(1+gm3×R3). That is, the target voltage Vref1 output from the virtual ripple generator 8 in the off-control of the switching element 1 rises from the voltage Vref' as time progresses, and the magnitude of the target voltage Vref1 is proportional to the output voltage Vout.

Figure 4:
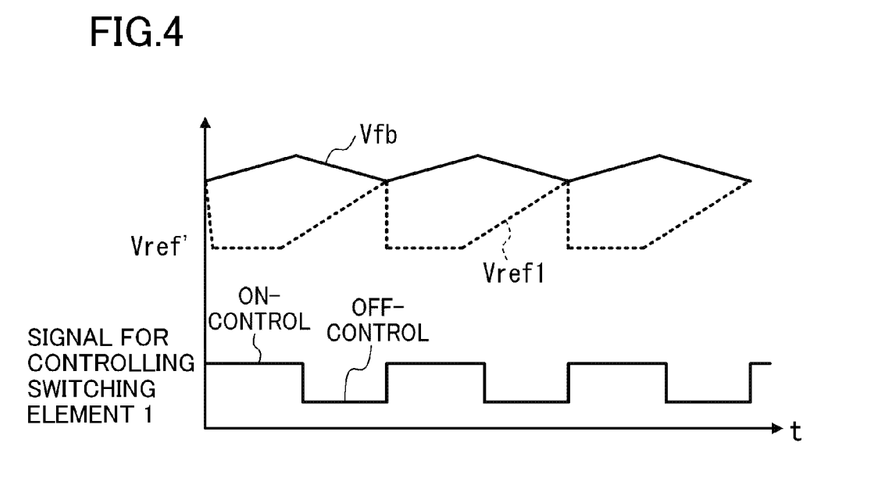
FIG. 4 is a graph illustrating signal waveforms of the switching regulator of FIG. 3.

Output waveforms of the virtual ripple generator 8 are as shown in FIG. 4. In general, an output ripple voltage of a step-down switching regulator is caused by a voltage drop due to a ripple current flowing through an output capacitor and equivalent series resistance of the output capacitor, and the magnitude of the ripple current in the off-control is proportional to the output voltage. Thus, by superimposing the output ripple voltage on the target voltage which is a comparison target of the output voltage, hysteretic control with reduced output ripple voltages is possible. Note that this advantage is independent from the function of the overcurrent protection, the latch circuit 121 and the logic circuits 122 and 123 may be omitted from the control circuit 12.

In the normal operation, the off-time of the switching element 1 is (Vin−Vout)/Vin×T1, and thus, a termination condition of the off-control of the switching element 1 is represented by $$\begin{aligned} Vfb &= Vref1 \\ &= Vref' + Vout(Vin-Vout)/Vin \times T1/T3 \\ &= Vref - Vout(Vin-Vout)/Vin \times (R1/Rx - T1/T3). \end{aligned}$$

Thus, by setting the values of the elements to satisfy the equation R1/Rx=T1/T3, the termination condition of the off-time control of the switching element 1 is represented by Vfb=Vref. That is, regardless of fluctuations in the input voltage Vin and the output voltage Vout, the termination condition of the off-time control of the switching element 1 is held constant.

On the other hand, the latch circuit 121 is reset in the overcurrent protection. That is, when the output of the current comparator 79 is at an H level, the off-control of the switching element 1 ends. Where transfer admittance of the current source 762 is gm2, an output current I2 of the current source 762 is represented by $$I2 = gm2 \times Vout/Roff/Coff \times t/(1+gm3 \times R3).$$

When the current I2 gradually increases to exceed a current Vout (Vin−Vout)/Vin/Rx flowing through the transistor 791, the output of the current comparator 79 goes to an H level. Therefore, the time Toff required for this is represented by $$\begin{aligned} Toff &= Vout(Vin-Vout)/Vin/Rx/ \\ &\quad (gm2 \times Vout/Coff/Roff/(1+gm3 \times R3)) \\ &= (Vin-Vout)/Vin \times Coff Roff/(1+gm3 \times R3)/Rx/gm2 \\ &= (Vin-Vout)/Vin \times T4. \end{aligned}$$

Note that a constant T4=CoffRoff (1+gm3×R3)/Rx/gm2. Thus, by setting the values of the elements to satisfy the equation T1=T4, the switching frequencies and the duty ratios in the normal operation and in the overcurrent protection are equal. This eliminates disorder of the switching control at the transition of the control modes, thereby enabling smooth transition of the control modes.

As described above, according to this embodiment, the off-time timer 7 and the virtual ripple generator 8 can share part of the circuit, and thus, the entire circuit scale and power consumption can be reduced. Moreover, since the reference value of the target voltage adoptively varies in accordance with the input voltage and the output voltage, more precise outputs can be obtained.

What is claimed is:

1. A switching regulator configured to generate an output voltage by stepping down an input voltage by switching control of a switching element, the switching regulator comprising:
    a first comparator configured to compare a feedback voltage of the output voltage and a target voltage;
    a second comparator configured to compare magnitude of a current flowing through the switching element and a predetermined value;
    an on-time timer configured to measure fixed on-time for on-control of the switching element;
    an off-time timer configured to measure fixed off-time for off-control of the switching element; and
    a control circuit configured to perform the on-control of the switching element with the fixed on-time in accordance with an output of the first comparator, and the off-control of the switching element with the fixed off-time in accordance with an output of the second comparator.

2. The switching regulator of claim 1, wherein the on-time timer measures as the fixed on-time, time according to a value obtained by dividing the output voltage by the input voltage.

3. The switching regulator of claim 2, wherein
    the on-time timer includes
        a current source configured to output a current according to the input voltage,
        a capacitive element connected to the current source,
        a second switching element connected in parallel to the capacitive element, being conductive during the off-control of the switching element, and being non-conductive during the on-control of the switching element,
        a voltage source configured to output a voltage according to the output voltage, and a voltage comparator configured to compare an output of the voltage source and a charging voltage of the capacitive element.

4. The switching regulator of claim 1, wherein the off-time timer measures as the fixed off-time, time according to a value obtained by dividing the difference between the input voltage and the output voltage by the input voltage.

5. The switching regulator of claim 4, wherein the off-time timer includes
- a current source configured to output a current according to the input voltage,
- a capacitive element connected to the current source,
- a second switching element connected in parallel to the capacitive element, being conductive during the on-control of the switching element, and being non-conductive at least during the off-control of the switching element with the fixed off-time,
- a voltage source configured to output a voltage according to the difference between the input voltage and the output voltage, and
- a voltage comparator configured to compare an output of the voltage source and a charging voltage of the capacitive element.

6. The switching regulator of claim 4, wherein the off-time timer includes
- a first current source configured to output a current according to the output voltage,
- a second current source configured to output a current according to a value obtained by dividing the product of the output voltage and the difference between the input voltage and the output voltage by the input voltage,
- a capacitive element connected to the first current source,
- a second switching element connected in parallel to the capacitive element, being conductive during the on-control of the switching element, and being non-conductive at least during the off-control of the switching element with the fixed off-time,
- a third current source configured to output a current according to a charging voltage of the capacitive element, and
- a current comparator configured to compare an output of the second current source and an output of the third current source.

7. The switching regulator of claim 1 further comprising a virtual ripple generator configured to generate as the target voltage, a voltage obtained by superimposing on a predetermined voltage, a voltage varying for a predetermined time period every time the switching element is turned off.

8. The switching regulator of claim 7, wherein the virtual ripple generator superimposes the voltage varying for the predetermined time period on a voltage obtained by subtracting from a given reference voltage, a voltage according to a value obtained by dividing the product of the output voltage and the difference between the input voltage and the output voltage by the input voltage.

9. The switching regulator of claim 8, wherein the off-time timer includes
- a first current source configured to output a current according to the output voltage,
- a second current source configured to output a current according to a value obtained by dividing the product of the output voltage and the difference between the input voltage and the output voltage by the input voltage,
- a capacitive element connected to the first current source,
- a second switching element connected in parallel to the capacitive element, being conductive during the on-control of the switching element, and being non-conductive during the off-control of the switching element,
- a third and fourth current sources, each configured to output a current according to a charging voltage of the capacitive element, and
- a current comparator configured to compare an output of the second current source and an output of the third current source, and
the virtual ripple generator includes
- a fifth current source configured to output a mirror current of the output of the second current source,
- a first resistive element connected between the reference voltage and the fifth current source,
- a voltage buffer to which a voltage of the first resistive element is input, and
- a second resistive element connected between the fourth current source and an output terminal of the voltage buffer.

10. The switching regulator of claim 1, wherein the control circuit includes
- a first latch circuit set by the output of the second comparator, and reset by an output of the off-time timer,
- a first logic circuit configured to perform logical operation on the output of the first comparator and an output of the first latch circuit,
- a second logic circuit configured to perform logical operation on the output of the second comparator and an output of the on-time timer, and
- a second latch circuit set by an output of the first logic circuit, and reset by an output of the second logic circuit, and
the switching element performs switching operation in accordance with an output of the second latch circuit.

11. A switching regulator configured to generate an output voltage by stepping down an input voltage by switching control of a switching element, the switching regulator comprising:
- a comparator configured to compare a feedback voltage of the output voltage and a target voltage;
- an on-time timer configured to measure fixed on-time for on-control of the switching element;
- a control circuit configured to perform the on-control of the switching element with the fixed on-time in accordance with an output of the comparator; and
- a virtual ripple generator configured to generate as the target voltage, a voltage obtained by superimposing on a predetermined voltage, a voltage varying for a predetermined time period every time the switching element is turned off,
wherein the virtual ripple generator superimposes the voltage varying for the predetermined time period on a voltage obtained by subtracting from a given reference voltage, a voltage according to a value obtained by dividing the product of the output voltage and the difference between the input voltage and the output voltage by the input voltage.

12. The switching regulator of claim 11, further comprising:
- a first current source configured to output a current according to the output voltage;
- a second current source configured to output a current according to a value obtained by dividing the product of the output voltage and the difference between the input voltage and the output voltage by the input voltage;

a capacitive element connected to the first current source;

a second switching element connected in parallel to the capacitive element, being conductive during the on-control of the switching element, and being non-conductive during the off-control of the switching element;

a third and fourth current sources, each configured to output a current according to a charging voltage of the capacitive element; and a current comparator configured to compare an output of the second current source and an output of the third current source, wherein the virtual ripple generator includes
- a fifth current source configured to output a mirror current of the output of the second current source,
- a first resistive element connected between the reference voltage and the fifth current source,
- a voltage buffer to which a voltage of the first resistive element is input, and
- a second resistive element connected between the fourth current source and an output terminal of the voltage buffer.

* * * * *